US010458351B2

(12) United States Patent
Wilder et al.

(10) Patent No.: US 10,458,351 B2
(45) Date of Patent: Oct. 29, 2019

(54) ENGINE TORQUE RESERVE TECHNIQUES FOR OPTIMIZING DRAG RACING TRANSIENT RESPONSE

(71) Applicants: James M Wilder, Farmington Hills, MI (US); Christopher E. Pueppke, Clarkston, MI (US); Joseph M Johnson, Grand Blanc, MI (US); Ibrahim Alkeilani, Auburn Hills, MI (US); Anwar Alkeilani, Orion Charter Township, MI (US)

(72) Inventors: James M Wilder, Farmington Hills, MI (US); Christopher E. Pueppke, Clarkston, MI (US); Joseph M Johnson, Grand Blanc, MI (US); Ibrahim Alkeilani, Auburn Hills, MI (US); Anwar Alkeilani, Orion Charter Township, MI (US)

(73) Assignee: FCA US LLC, Auburn Hills, MI (US)

( * ) Notice: Subject to any disclaimer, the term of this patent is extended or adjusted under 35 U.S.C. 154(b) by 151 days.

(21) Appl. No.: 15/829,334

(22) Filed: Dec. 1, 2017

(65) Prior Publication Data

US 2019/0170076 A1 Jun. 6, 2019

(51) Int. Cl.
*B60W 30/18* (2012.01)
*F02D 41/10* (2006.01)
*F16H 63/50* (2006.01)
*F02M 35/10* (2006.01)
*F02D 41/00* (2006.01)
*F02D 11/10* (2006.01)

(52) U.S. Cl.
CPC ....... *F02D 41/10* (2013.01); *B60W 30/18027* (2013.01); *F02D 11/105* (2013.01); *F02D 41/0002* (2013.01); *F02D 41/0087* (2013.01); *F02M 35/10163* (2013.01); *F16H 63/50* (2013.01); *F02D 2250/22* (2013.01)

(58) Field of Classification Search
CPC .................. B60W 30/18027; F02D 41/10
See application file for complete search history.

(56) References Cited

U.S. PATENT DOCUMENTS

| 6,701,246 | B2 | 3/2004 | Riedle et al. |
| 8,027,780 | B2 * | 9/2011 | Whitney ............... F02D 11/105 123/436 |
| 9,309,824 | B2 * | 4/2016 | Kar ..................... F02D 13/0219 |
| 9,731,725 | B2 * | 8/2017 | Riedle ............... B60W 30/1882 |

(Continued)

*Primary Examiner* — Derek D Knight
(74) *Attorney, Agent, or Firm* — Ralph E Smith

(57) ABSTRACT

A control system and method for controlling vehicle launch includes receiving a request to enable a launch control feature of a traction control system of the vehicle, the launch control feature being configured to improve torque transfer from an engine of the vehicle to a driveline of the vehicle; and in response to receiving the enable request for the launch control feature, generating a torque reserve at the engine by (i) increasing airflow into the engine to a level greater than a level for achieving a torque request for the engine and (ii) deactivating a predetermined set of cylinders of the engine by disabling their respective fuel injectors; detecting an intent of the driver to launch the vehicle; and in response to detecting the intent of the driver to launch the vehicle, releasing the torque reserve to increase a torque output of the engine based on the engine torque request.

14 Claims, 2 Drawing Sheets

(56) References Cited

U.S. PATENT DOCUMENTS

2010/0280738 A1 11/2010 Whitney et al.
2011/0144876 A1 6/2011 Miah
2014/0081559 A1 3/2014 Kar

* cited by examiner

ENGINE TORQUE RESERVE TECHNIQUES FOR OPTIMIZING DRAG RACING TRANSIENT RESPONSE

FIELD

The present application generally relates to engine torque control and, more particularly, to engine torque reserve techniques for optimizing drag racing transient response.

BACKGROUND

Some high performance vehicles are configured to operate in a plurality of different performance modes, one of which is a maximum performance mode commonly referred to as a "track mode" or "drag mode." In this mode, the vehicle is controlled to maximize performance, which typically involves maximizing engine torque output. A suspension system (e.g., shock absorbers) of the vehicle could also be controlled during this mode. For very high horsepower engine applications, however, the vehicle may be unable to quickly transfer all of the engine's potential torque to the ground via its driveline. This is particularly true when brake launching the vehicle from a complete stop, which is commonly performed while drag racing. Traction control systems are often implemented and are configured to increase vehicle traction, but these systems are limited and are often overpowered by such high horsepower engines. Accordingly, while these vehicle systems do work well for their intended purpose, there remains a need for improvement in the relevant art.

SUMMARY

According to one example aspect of the invention, a control system for a vehicle is presented. In one exemplary implementation, the control system comprises an input device configured to receive a request to enable a launch control feature of a traction control system of the vehicle, the launch control feature being configured to improve torque transfer from an engine of the vehicle to a driveline of the vehicle, and a controller configured to: in response to receiving the enable request for the launch control feature, generate a torque reserve at the engine by: (i) increasing airflow into the engine to a level greater than a level for achieving a torque request for the engine and (ii) deactivating a predetermined set of cylinders of the engine by disabling their respective fuel injectors; detect an intent of the driver to launch the vehicle; and in response to detecting the intent of the driver to launch the vehicle, release the torque reserve to increase a torque output of the engine based on the engine torque request.

In some implementations, the predetermined set of cylinders are selected based on a firing order of the cylinders of the engine such that operating the engine with the predetermined set of cylinders deactivated (i) increases noise/vibration/harshness (NVH) of the engine and (ii) modifies an exhaust note of an exhaust system of the vehicle. In some implementations, the controller is configured to increase the airflow into the engine to the level greater than the level for achieving the engine torque request by: further opening a throttle valve of the engine; and closing a bypass valve of a supercharger of the engine.

In some implementations, the controller is configured to release the torque reserve by: enabling the disabled fuel injectors to reactivate the predetermined set of cylinders; and controlling the airflow into the engine based on the engine torque request. In some implementations, the controller is configured to release the torque reserve according to a predetermined curve that is calibrated for minimized tire slippage.

In some implementations, the controller is configured to detect the intent of the driver to launch the vehicle based on a position of an accelerator pedal of the vehicle. In some implementations, the input device is configured to receive the launch control feature request upon the vehicle transitioning to a drag mode during which a transbrake feature maintains the vehicle at a complete stop without the driver applying a brake pedal of the vehicle.

According to another example aspect of the invention, a method of controlling a vehicle is presented. In one exemplary implementation, the method comprises receiving, by a controller of the vehicle and from an input device of the vehicle, a request to enable a launch control feature of a traction control system of the vehicle, the launch control feature being configured to improve torque transfer from an engine of the vehicle to a driveline of the vehicle; and in response to receiving the enable request for the launch control feature: generating, by the controller, a torque reserve at the engine by: (i) increasing airflow into the engine to a level greater than a level for achieving a torque request of the engine and (ii) deactivating a predetermined set of cylinders of the engine by disabling their respective fuel injectors; detecting, by the controller, an intent of the driver to launch the vehicle; and in response to detecting the intent of the driver to launch the vehicle, releasing, by the controller, the torque reserve to increase a torque output of the engine based on the engine torque request.

In some implementations, the predetermined set of cylinders are selected based on a firing order of the cylinders of the engine such that operating the engine with the predetermined set of cylinders deactivated (i) increases noise/vibration/harshness (NVH) of the engine and (ii) modifies an exhaust note of an exhaust system of the vehicle. In some implementations, increasing the airflow into the engine to the level greater than the level for achieving the engine torque request comprises: further opening, by the controller, a throttle valve of the engine; and closing, by the controller, a bypass valve of a supercharger of the engine.

In some implementations, releasing the torque reserve comprises: enabling, by the controller, the disabled fuel injectors to reactivate the predetermined set of cylinders; and controlling, by the controller, the airflow into the engine based on the engine torque request. In some implementations, releasing the torque reserve is performed according to a predetermined curve that is calibrated for minimized tire slippage.

In some implementations, detecting the intent of the driver to launch the vehicle is performed based on a position of an accelerator pedal of the vehicle. In some implementations, the input device is configured to receive the launch control feature request upon the vehicle transitioning to a drag mode during which a transbrake feature maintains the vehicle at a complete stop without the driver applying a brake pedal of the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As mentioned above, there remains a need for improvement in maximizing the transfer of drive torque from an engine of the vehicle to the ground via a driveline, particularly for very high horsepower engine applications. More specifically, these types of vehicles are often unable to quickly transfer all of the engine's potential drive torque to the ground, which results in decreased performance, particularly during brake launches from a complete stop. For example, when drag racing, the driver is attempting to achieve the fastest vehicle launch possible, e.g., to achieve lower 0-60 mile per hour, 0-60 feet times, and/or quarter-mile times. Absent improved engine-to-ground torque transfer methods, any excess horsepower above a certain level could provide lithe to no benefit on vehicle launches. Conventional methods for improving transient response for vehicle launches include brake launching, where the driver depresses both an accelerator pedal and a brake pedal, thereby increasing engine speed while holding the vehicle at a complete stop. These methods, however, are still unable to quickly or immediately transfer all of the engine's potential drive torque to the ground, which is particularly true for high horsepower applications.

Accordingly, techniques are presented that generate a torque reserve for optimizing drag racing transient response. In response to a request to enable a launch control feature of a traction control system of a vehicle, the vehicle generates a torque reserve by (i) increasing airflow to the engine above a level required to achieve an engine torque request (e.g., at idle) and (ii) deactivating a predetermined set of cylinders of the engine by disabling their respective fuel injectors. In some implementations, the cylinder(s) are selected such that the noise/vibration/harshness (NVH) of the engine increases and an exhaust note of an exhaust system of the vehicle changes. The net effect of increasing airflow and deactivating cylinder(s) of the engine results in approximately the same engine output torque. However, upon detecting a driver intent to launch the vehicle (e.g., depressing an accelerator pedal), this torque reserve is depleted by reactivating the predetermined set of cylinders by enabling their respective fuel injectors and controlling airflow based on the engine torque request.

Figure 1:
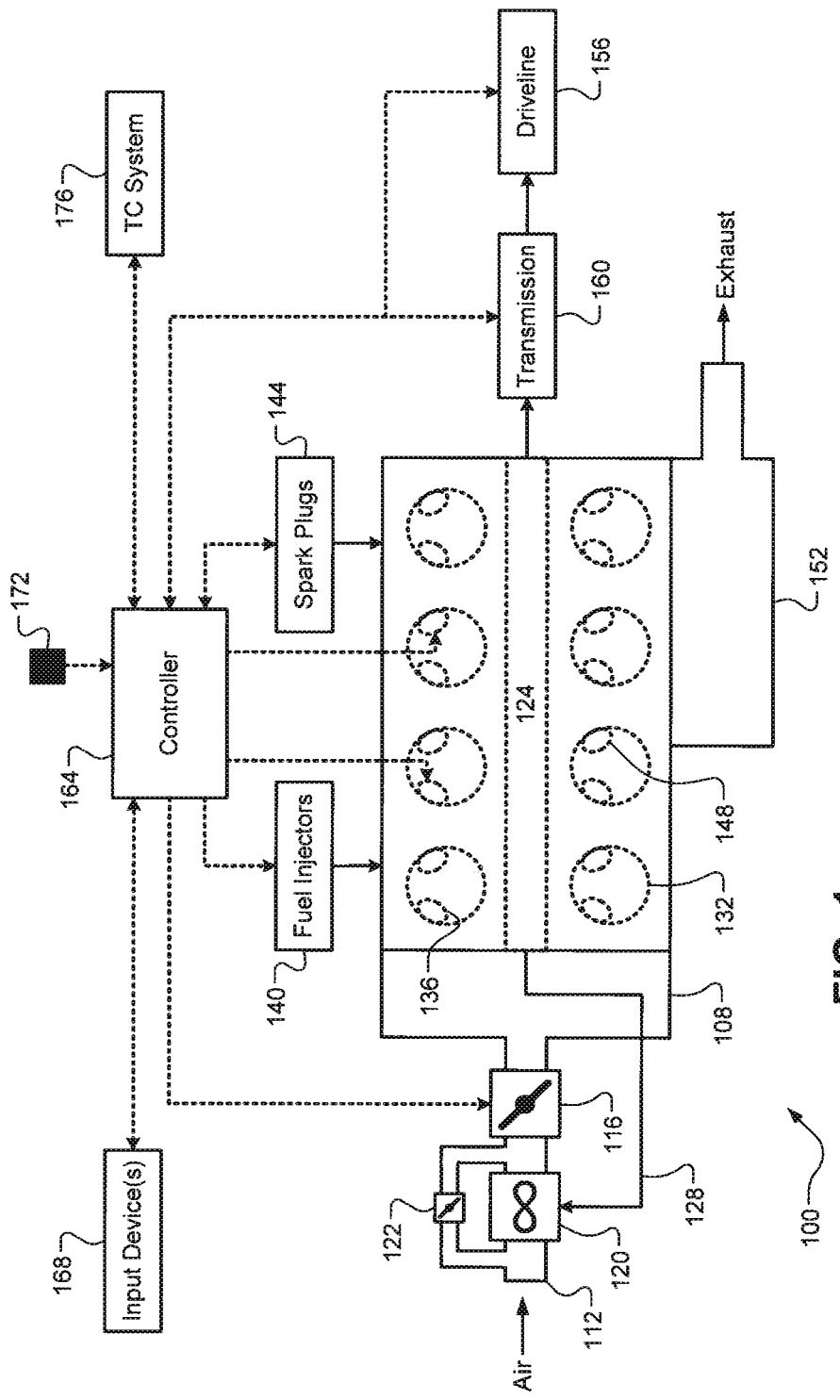
FIG. 1 is a diagram of an example vehicle according to the principles of the present disclosure.

Referring now to FIG. 1, a diagram of an example vehicle 100 is illustrated. The vehicle 100 includes an internal combustion engine 104 that combusts an air/fuel mixture to generate drive torque. The engine 104 draws air into an intake manifold 108 through an induction system 112 that is regulated by a throttle valve 116. A supercharger 120 compresses air in the induction system 112, thereby forcing additional air into the intake manifold 108 creating boost pressure in the intake manifold 108. In one exemplary implementation, the supercharger 120 is a compressor that is mechanically-driven by a crankshaft 124 of the engine 104 via a linkage 128 (a chain, a belt, etc.). A supercharger bypass valve 122 is configured to be opened to bypass the supercharger 120. The additional air (boost) provided by the supercharger 120, when combined with additional fuel, is used to produce additional drive torque. While a supercharger 120 is illustrated, it will be appreciated that the engine 104 could include additional or alternative boost or forced-induction systems, such as one or more turbochargers.

The air in the intake manifold 108 is distributed to a plurality of cylinders 132 via respective intake valves 136. While eight cylinders are shown, it will be appreciated that the engine 104 could include a different number of cylinders. In one exemplary implementation, the eight cylinders 132 are arranged in a V-configuration having two distinct banks of four cylinders each. The air is combined with fuel from respective fuel injectors 140 and the air/fuel mixture is compressed within combustion chambers (not shown) by pistons (not shown) within the cylinders 132 and ignited by sparks from respective spark plugs 140 to drive the pistons, which rotatably turn the crankshaft 124 to generate drive torque. In one exemplary implementation, the combustion chambers are hemispherical combustion chambers.

Exhaust gas resulting from combustion is expelled from the cylinders 132 via respective exhaust valves 148 and into an exhaust system 152 that treats the exhaust gas to decrease or eliminate emissions before it is released into the atmosphere. The drive torque at the crankshaft 124 is transferred to a driveline 156 of the vehicle 100 by a transmission 160. In one exemplary implementation, the transmission 160 is an eight-speed automatic transmission, but it will be appreciated that the transmission 160 could be any suitable manual or automatic transmission. A controller 164 controls operation of the engine 104, include airflow (e.g., the throttle 116 and/or intake valves 136), the fuel injectors 140, and the spark plugs 144. The controller 164 also receives input from one or more driver input devices 168 (an accelerator pedal, a brake pedal, steering wheel actuators, an infotainment system etc.) and signals from one or more vehicle sensors 172 (an engine speed sensor, a vehicle speed sensor, wheel speed sensors, etc.).

In some implementations, the vehicle 100 includes a traction control (TC) system 176 configured to control the vehicle 100 to increase traction between the driveline 156 (e.g., tires) and the ground. While illustrated as a separate system, it will be appreciated that at least some aspects of the TC system 176 could be implemented as software executed by or a sub-system of the controller 164. The TC system 176 represents on aspect of vehicle electronic stability control (ESC) and could be activated, for example, when throttle input and engine torque are mismatched to surface conditions. Example functions performed by the TC system 176 include, but are not limited to, applying brakes 180 to one or more wheels, reduction/suppression of spark, reduction/suppression of fuel, closing the throttle valve 116, and opening the supercharger bypass valve 122. The TC system 176 (e.g., in conjunction with the controller 164) is also configured to implement the launch control feature discussed herein.

Figure 2:
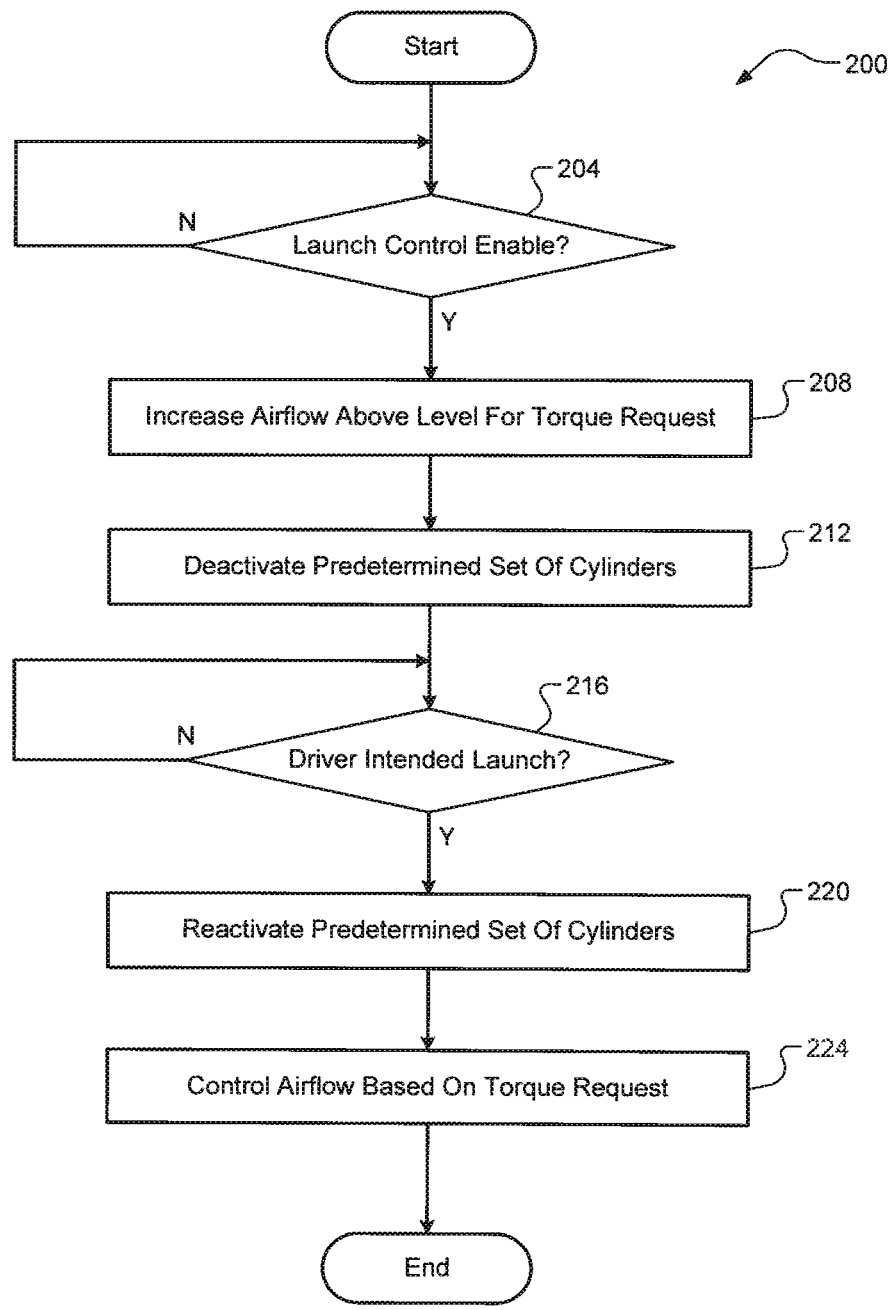
FIG. 2 is a flow diagram of an example method of engine torque reserve control for optimizing drag racing transient response according to the principles of the present disclosure.

Referring now to FIG. 2, an example method 200 of generating an engine torque reserve for optimizing drag racing transient response is illustrated. At 204, the controller 164 determines whether a request to enable the launch control feature of the TC system 176 has been received. For example, the driver could provide the request to enable the launch control feature via an infotainment system or using steering wheel actuators. Another precondition for generating the request could be that the vehicle 100 is at a complete stop (e.g., zero miles per hour). For example only, the driver could transition the vehicle 100 to the track or drag mode, which would activate a transbrake feature (allowing the driver to take his/her foot off the brake pedal) and automatically enable the launch control feature. The transbrake feature may involve the transmission 160 simultaneously engaging its first and reverse gears. Implementing the transbrake feature for an automatic transmission with a torque converter also provides the benefit of increased hydraulic pressure prior to the vehicle launch. It will be appreciated, however, that the techniques of the present disclosure could be implemented on vehicles that do not have a transbrake or launch control feature.

When the request has been received, the method 200 proceeds to 208. Otherwise, the method 200 returns to 204 and waits for the request or the method 200 ends. At 208 and 212, the controller 164 controls the engine 104 to generate a torque reserve. Specifically, at 208 the controller 164 controls the throttle valve 116 to increase airflow into the engine 104 above a level required to achieve the engine's torque request (e.g., at idle) and at 212 the controller 164 deactivates a predetermined set of the cylinders 132 by disabling their respective fuel injectors 140. In one exemplary implementation, increasing the airflow includes building boost pressure in the system (e.g., in the intake manifold 108) by further opening the throttle valve 116 and closing the supercharger bypass valve 122. In addition to disabling fuel, also known as fuel shutoff, cylinder deactivation could optionally involve closing one or both of the intake and exhaust valves 136, 148 for a particular cylinder 132, although this is not required. Optionally, ignition timing by the spark plugs 140 could be temporarily retarded instead of or in addition to disabling fueling and/or cylinders to generate the torque reserve.

In one exemplary implementation, the predetermined set of cylinders 132 are selected such that the engine 104, while operating with the predetermined set of cylinders 132 deactivated, will produce desired NVH and/or acoustic characteristics. For example, the predetermined set of cylinders 132 could be selected based on a firing pattern of the cylinders 132 such that NVH is increased and/or an exhaust note of the exhaust system 152 is modified. The net effect of the increased NVH and/or modified exhaust note is to have the vehicle 100 give off an aggressive vibe. For example only, the predetermined set of the cylinders 132 could comprise four of the eight cylinders as shown in FIG. 1, such as two from each cylinder bank. At 216, the controller 164 determines whether the driver is intending to launch the vehicle 100.

This determination could be made based on levels of brake pedal and/or accelerator pedal position/depression. In one exemplary implementation, however, the vehicle 100 may be held at a complete stop while in the drag mode and the transbrake feature is activated as previously discussed herein. Thus, the driver intended launch could be detected solely based on the position/depression of the accelerator pedal, e.g., when the driver fully depresses the accelerator pedal. In other modes (street, custom, etc.), the launch control feature could be activated and the vehicle 100 could be held at a complete stop or a low speed less than a threshold (e.g., a few miles per hour, such as for a rolling start or launch) by driver input via the brake pedal. When this driver launch intent is detected, the method 200 proceeds to 220. Otherwise, the method 200 returns to 216 and waits until the driver launch intent is detected or the method 200 ends. At 220 and 224, the controller 164 depletes or releases the torque reserve as part of the vehicle launch operation.

In one exemplary implementation, this release of the torque reserve includes reactivating the predetermined set of cylinders 132 at 220 by enabling their respective fuel injectors 140 (and enabling/opening their respective valves 136, 148 if they were commanded closed) and controlling the airflow based on the engine's torque request at 224, which has drastically increased as part of the launch operation. The torque reserve could be immediately depleted or could be depleted according to a predetermined curve, e.g., calibrated for minimum tire slippage, or in some series of steps or intervals. By not depleting the torque reserve instantaneously, the large amount of drive torque is more gradually applied to the driveline 156, thereby providing for even better traction. In some implementations, the TC system 176 is simultaneously controlled (e.g., coordinated control) while depleting the torque reserve to provide for the most optimal vehicle launch. The method 200 then ends or returns to 204.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is chimed is:

1. A control system for controlling launch of a vehicle, the control system comprising:
    an input device configured to receive a request to enable a launch control feature of a traction control system of the vehicle, the launch control feature being configured to improve torque transfer from an engine of the vehicle to a driveline of the vehicle; and
    a controller configured to:
        in response to receiving the enable request for the launch control feature, generate a torque reserve at the engine by:
            (i) increasing airflow into the engine to a level greater than a level for achieving a torque request for the engine, and
            (ii) deactivating a predetermined set of cylinders of the engine by disabling their respective fuel injectors;
        detect an intent of the driver to launch the vehicle; and
        in response to detecting the intent of the driver to launch the vehicle, release the torque reserve to increase a torque output of the engine based on the engine torque request.

2. The control system of claim 1, wherein the predetermined set of cylinders are selected based on a firing order of the cylinders of the engine such that operating the engine with the predetermined set of cylinders deactivated (i) increases noise/vibration/harshness (NVH) of the engine and (ii) modifies an exhaust note of an exhaust system of the vehicle.

3. The control system of claim 1, wherein the controller is configured to increase the airflow into the engine to the level greater than the level for achieving the engine torque request by:
   further opening a throttle valve of the engine; and
   closing a bypass valve of a supercharger of the engine.

4. The control system of claim 1, wherein the controller is configured to release the torque reserve by:
   enabling the disabled fuel injectors to reactivate the predetermined set of cylinders; and
   controlling the airflow into the engine based on the engine torque request.

5. The control system of claim 4, wherein the controller is configured to release the torque reserve according to a predetermined curve that is calibrated for minimized tire slippage.

6. The control system of claim 1, wherein the controller is configured to detect the intent of the driver to launch the vehicle based on a position of an accelerator pedal of the vehicle.

7. The control system of claim 1, wherein the input device is configured to receive the launch control feature request upon the vehicle transitioning to a drag mode during which a transbrake feature maintains the vehicle at a complete stop without the driver applying a brake pedal of the vehicle.

8. A method of controlling launch of a vehicle, the method comprising:
   receiving, by a controller of the vehicle and from an input device of the vehicle, a request to enable a launch control feature of a traction control system of the vehicle, the launch control feature being configured to improve torque transfer from an engine of the vehicle to a driveline of the vehicle; and
   in response to receiving the enable request for the launch control feature:
      generating, by the controller, a torque reserve at the engine by:
         (i) increasing airflow into the engine to a level greater than a level for achieving a torque request of the engine, and
         (ii) deactivating a predetermined set of cylinders of the engine by disabling their respective fuel injectors;
      detecting, by the controller, an intent of the driver to haunch the vehicle; and
      in response to detecting the intent of the driver to launch the vehicle, releasing, by the controller, the torque reserve to increase a torque output of the engine based on the engine torque request.

9. The method of claim 8, wherein the predetermined set of cylinders are selected based on a firing order of the cylinders of the engine such that operating the engine with the predetermined set of cylinders deactivated (i) increases noise/vibration/harshness (NVH) of the engine and (ii) modifies an exhaust note of an exhaust system of the vehicle.

10. The method of claim 8, wherein increasing the airflow into the engine to the level greater than the level for achieving the engine torque request comprises:
   further opening, by the controller, a throttle valve of the engine; and
   closing, by the controller, a bypass valve of a supercharger of the engine.

11. The method of claim 8, wherein releasing the torque reserve comprises:
   enabling, by the controller, the disabled fuel injectors to reactivate the predetermined set of cylinders; and
   controlling, by the controller, the airflow into the engine based on the engine torque request.

12. The method of claim 11, wherein releasing the torque reserve is performed according to a predetermined curve that is calibrated for minimized tire slippage.

13. The method of claim 8, wherein detecting the intent of the driver to launch the vehicle is performed based on a position of an accelerator pedal of the vehicle.

14. The method of claim 8, wherein the input device is configured to receive the launch control feature request upon the vehicle transitioning to a drag mode during which a transbrake feature maintains the vehicle at a complete stop without the driver applying a brake pedal of the vehicle.

* * * * *